(12) United States Patent
Greenberg

(10) Patent No.: US 11,052,496 B2
(45) Date of Patent: Jul. 6, 2021

(54) BACKING MATERIAL FOR WELDING

(71) Applicant: WORLDWIDE MACHINERY, LTD., Houston, TX (US)

(72) Inventor: J. Evan Greenberg, Houston, TX (US)

( * ) Notice: Subject to any disclaimer, the term of this patent is extended or adjusted under 35 U.S.C. 154(b) by 0 days.

(21) Appl. No.: 16/822,522

(22) Filed: Mar. 18, 2020

(65) Prior Publication Data

US 2021/0094130 A1    Apr. 1, 2021

Related U.S. Application Data

(60) Provisional application No. 62/906,522, filed on Sep. 26, 2019.

(51) Int. Cl.
*B23K 37/00*    (2006.01)
*B23K 37/053*   (2006.01)
*B23K 37/04*    (2006.01)
*B23K 37/06*    (2006.01)
*B23K 101/06*   (2006.01)
*B23K 101/10*   (2006.01)

(52) U.S. Cl.
CPC ...... *B23K 37/0531* (2013.01); *B23K 37/0443* (2013.01); *B23K 37/06* (2013.01); *B23K 2101/06* (2018.08); *B23K 2101/10* (2018.08)

(58) Field of Classification Search
CPC . B23K 20/126; B23K 20/129; B23K 37/0531
See application file for complete search history.

(56) References Cited

U.S. PATENT DOCUMENTS

| 5,356,067 A * | 10/1994 | Leduc | B23K 37/0531 |
| | | | 228/212 |
| 2014/0091128 A1* | 4/2014 | Vanderpol | B23K 9/16 |
| | | | 228/44.5 |
| 2015/0183054 A1* | 7/2015 | Okada | B23K 20/1255 |
| | | | 228/2.1 |

OTHER PUBLICATIONS

J&M Diamond Tool, Inc. (http://www.diamondtool.com/pcdcbm2a.html, Jun. 4, 2001) (Year: 2001).*

* cited by examiner

*Primary Examiner* — Erin B Saad

(57) ABSTRACT

A backing plate for includes a synthetic diamond portion configured to abut a joint region during a welding operation. A welding clamp includes a plurality of clamping blocks, each including a synthetic diamond portion configured to abut a pipe joint region during a welding operation. Because the backing plate and clamping block each include a synthetic diamond portion, the backing plate and clamping block can withstand high welding temperatures without damaging or diminishing the quality of the weld.

18 Claims, 8 Drawing Sheets

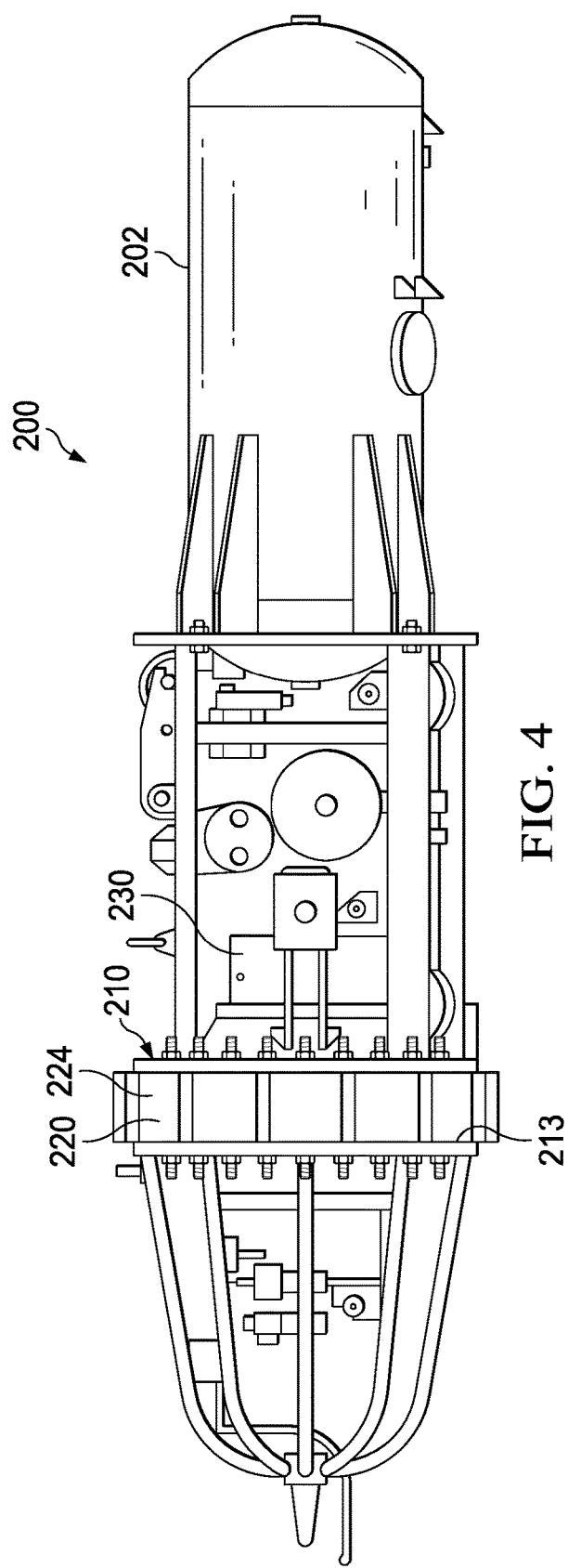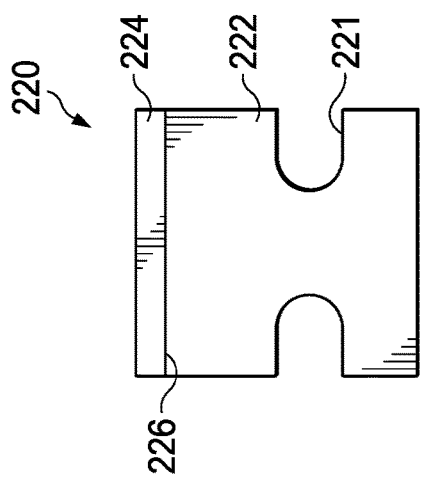
FIG. 4
FIG. 5

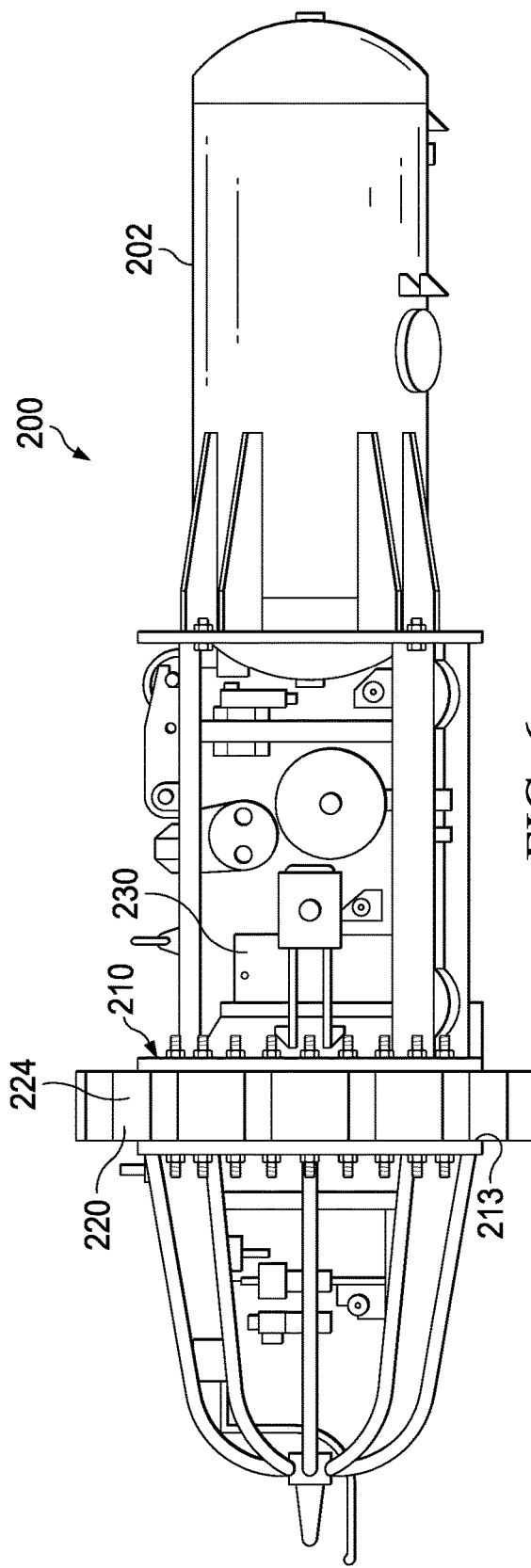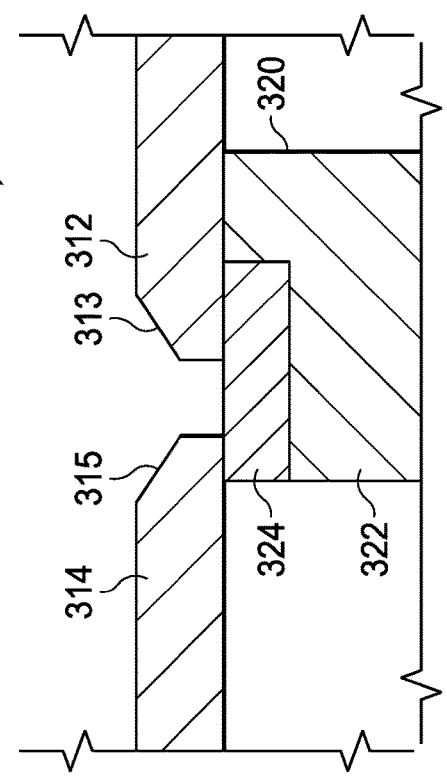

BACKING MATERIAL FOR WELDING

CROSS REFERENCE

This application claims priority from Provisional U.S. Application Ser. No. 62/906,522 filed on Sep. 26, 2019, and entitled WELDING CLAMP.

TECHNICAL FIELD

The present disclosure relates generally to backing material for welding and methods of use thereof, and more particularly, to backing material for welding, welding clamps for pipeline welding, and methods of use thereof.

BACKGROUND

Pipelines facilitate the transportation of liquids and/or gases through a system of pipes. Pipelines can be formed from steel pipes or tubes that are joined together. Pipes are often welded together to form connections therebetween. Pipelines can be welded manually or using automated devices.

During the welding of pipelines, the root pass or initial welding pass joins the two pipes together. However, one drawback of conventional welding techniques is that liquefied metal may migrate past the joint and into the pipe during the root pass, compromising the quality of the weld and potentially damaging the pipe. In certain applications, pipelines can be welded from inside the pipe diameter by using specialized welding equipment. However, such specialized welding equipment may be application specific and cost prohibitive.

In certain applications, clamps may be disposed within the pipe to prevent the dripping and migration of liquid metal. Some clamps may utilize copper pads to prevent liquefied metal from migrating past the joint. However, the use of clamps and/or copper pads can cause copper to be leached or otherwise introduced into the pipe joint, compromising the quality of the weld and the pipeline. Similar issues can occur with welding operations in applications other than pipelines. Therefore, what is needed is an apparatus, system or method that addresses one or more of the foregoing issues, among one or more other issues.

SUMMARY OF THE INVENTION

A backing plate for welding is disclosed. The backing plate includes a synthetic diamond portion configured to abut a joint region during a welding operation. Because the backing plate includes a synthetic diamond portion, the backing plate can withstand high welding temperatures without damaging or diminishing the quality of the weld. In some embodiments, the synthetic diamond portion can be polycrystalline diamond (PCD).

Further, a welding clamp is disclosed. The welding clamp includes a clamp body and a plurality of clamping blocks. The plurality of clamping blocks are configured to radially expand from the clamp body. Each clamping block includes a synthetic diamond or polycrystalline diamond (PCD) configured to abut a pipe joint region during a welding operation. Because the clamping blocks include a synthetic diamond portion, the welding clamp can withstand high welding temperatures without damaging or diminishing the quality of the weld.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 4 is an elevation view of a welding clamp.

FIG. 5 is an elevation view of a clamping block of the welding clamp of FIG. 4.

FIG. 6 is an elevation view of the welding clamp of FIG. 5 with the clamping blocks in an expanded position.

FIG. 7 is a partial cross-sectional view of a weld joint with a backing plate abutting the weld joint.

DETAILED DESCRIPTION

The disclosed backing plate incorporates a synthetic diamond portion that can withstand high welding temperatures without damaging or diminishing the quality of the weld.

The disclosed backing plate overcomes several challenges discovered with respect to certain conventional backing plates or clamping blocks. One challenge with certain conventional backing plates or clamping blocks is that they may utilize copper, which may leach into the weld. Further, certain conventional backing plates or clamping blocks can utilize ceramic materials, which may fracture or break during use. Another challenge with certain conventional backing plates or clamping blocks is that they may wear down and require replacement within a short period of time (e.g., a week of operation). Because copper contamination can create brittle or weak welds, ceramic materials may not withstand welding operations, and frequent replacement of certain conventional backing plates or clamping blocks can reduce productivity, the use of certain conventional backing plates or clamping blocks is undesirable.

Therefore, in accordance with the present disclosure, it is advantageous to provide backing plates or clamping blocks as described herein that provide for excellent thermal conduction and allow for welding operations without contaminating the weld. Further, it is advantageous to provide backing plates or clamping blocks that can withstand welding operations without frequent replacement. In accordance with the present disclosure, diamond and diamond-like materials, such as polycrystalline diamond (PCD) can provide extreme hardness, wear resistance, and thermal conductivity compared to conventional backing materials used during welding operations.

The disclosed backing plates and clamping blocks also allow for welding operations without contamination.

An example of backing plates or clamping blocks that allow for welding operations without contamination are now described.

Figure 1:
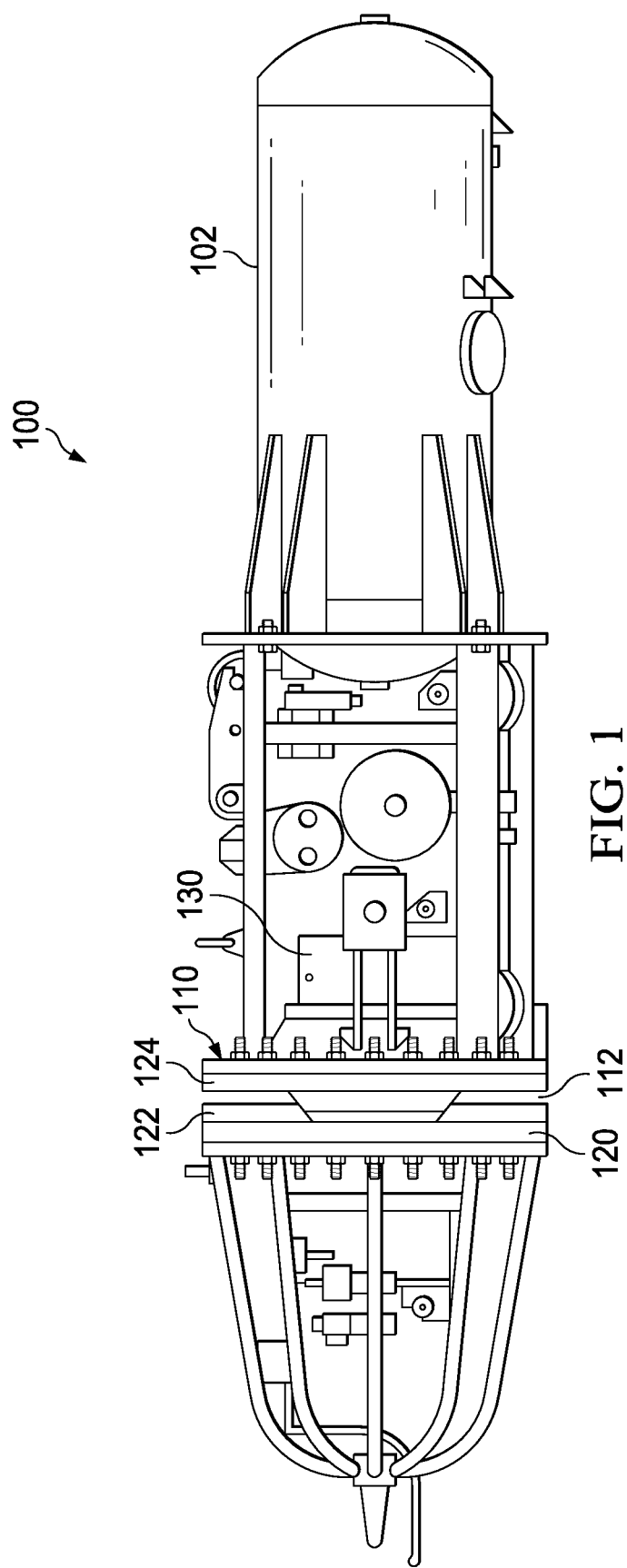
FIG. 1 is an elevation view of a welding clamp.

FIG. 1 is an elevation view of a welding clamp 100. In the depicted example, the welding clamp 100 can be run into pipes forming a pipeline to engage, align, or otherwise retain pipes during welding. As illustrated, in a retracted position, the clamp body 102 is disposed into the inner diameter of a pipe and is moved or translated to be adjacent to an open or partially welded pipe joint between pipes. In some embodiments, the welding clamp 100 can be moved within the inner diameter of the pipe by a travel mechanism. The travel mechanism can be electric motor, a diesel motor, a hydraulic actuator, and/or a pneumatic actuator to move the welding clamp 100 along the length of the pipe.

As illustrated, the welding clamp 100 includes a clamping mechanism 110 that can retract or extend the clamping blocks 120 toward or away from the clamp body 102. Optionally, in a retracted position, the clamping mechanism 110 can retract the clamping blocks 120 into a recess 112 to prevent the clamping blocks 120 from engaging with an inner diameter of the pipes as the welding clamp 100 is moved to a desired location within the pipeline. As illustrated, the clamping blocks 120 can have a trapezoidal shape. In some applications, as the clamping blocks 120 radially retract, the clamping blocks 120 can translate relative to each other.

In some embodiments, an actuator mechanism 130 can move the clamping mechanism 110. In some applications, an actuator mechanism 130 can move each of the clamping blocks 120 radially outwardly from the clamp body 102 to engage against an inner diameter of the pipe or radially inward toward the clamp body 102 to disengage from the inner diameter of the pipe. In some embodiments, the actuators of the actuation mechanism 130 can be angled or otherwise configured to allow for translational movement of the clamping blocks 120. The actuator mechanism 130 can include one or more motors, linear actuators, pneumatic actuators, hydraulic circuits, etc.

Optionally, the clamping mechanism 110 can include an engagement mechanism to align and/or engage the clamp body 102 with the pipes. The engagement mechanism can include a plurality of engagement dogs that radially retract toward the clamp body 102 or radially extend from the clamp body 102. Optionally, in a retracted position, the engagement dogs can retract into a recess to prevent the engagement dogs from engaging with an inner diameter of the pipes as the welding clamp 100 is moved to a desired location within the pipeline.

Figure 2:
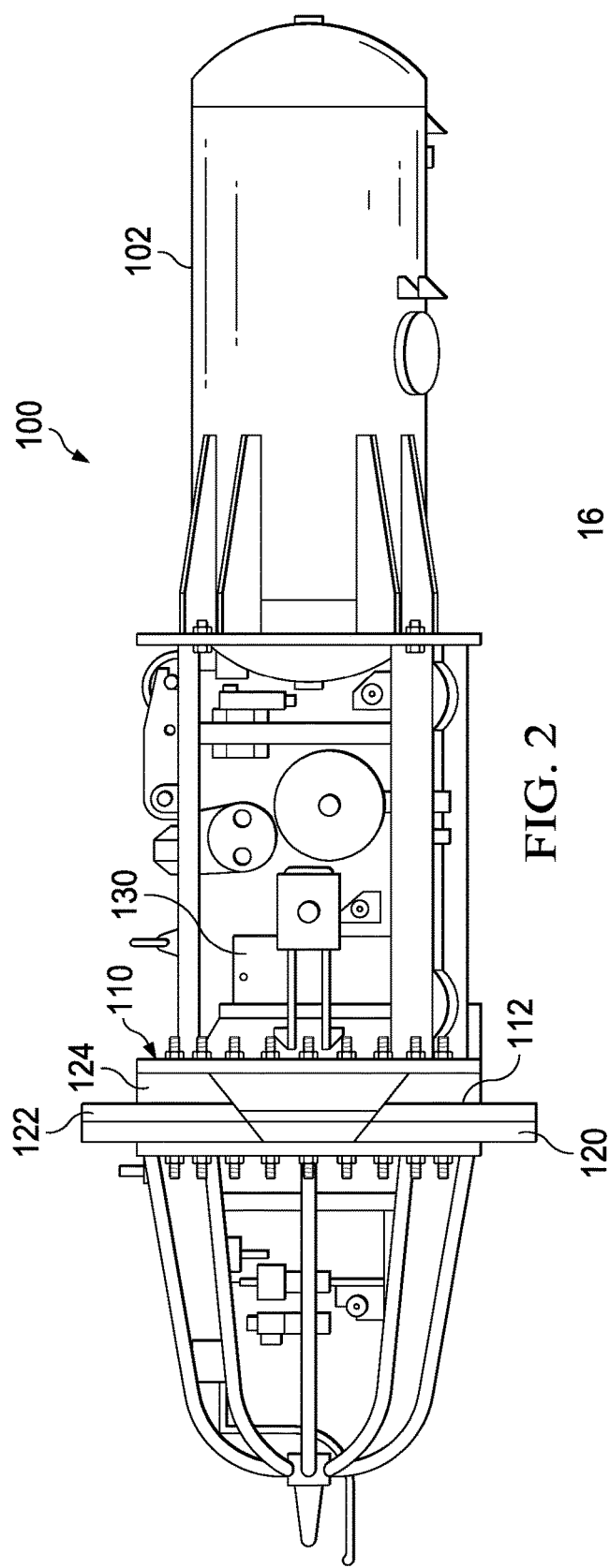
FIG. 2 is an elevation view of the welding clamp of FIG. 1 with the clamping blocks in an expanded position.

FIG. 2 is an elevation view of the welding clamp 100 of FIG. 1 with the clamping blocks 120 in an expanded position. After positioning the welding clamp 100 in a desired location, the clamping blocks 120 can be expanded to align with the pipe joint region between the pipes.

During operation, the clamping mechanism 110 can expand the clamping blocks 120 radially away from the clamp body 102 and toward the inner diameter of the abutting pipes. As can be appreciated, the cleats or clamping blocks 120 can extend across the pipe joint to engage or contact the first pipe and the second pipe of the pipe joint. In some applications, as the clamping blocks 120 radially expand, the clamping blocks 120 can translate relative to each other. Optionally, the actuator mechanism 130 can actuate the clamping mechanism 110 to engage or otherwise locate the clamping blocks 120 against the pipes.

Optionally, in addition to the clamping blocks 120, engagement dogs can be expanded to engage, align, or otherwise retain pipes at the pipe joint region between the pipes. During operation, the clamping mechanism 110 can expand the engagement dogs radially away from the clamp body 102 and toward the inner diameter of the abutting pipes. In some applications, a first set of engagement dogs can engage against the inner diameter of a first pipe and a second set of engagement dogs across the pipe joint can engage against the inner diameter of a second pipe. By engaging the inner diameter of the first pipe and the second pipe, the engagement dogs allow for the pipes and the welding clamp 100 to be aligned at the pipe joint.

In some embodiments, the engagement dogs can radially expand to have a larger overall diameter than the clamp body 102. In some applications, the actuated engagement dogs can exert force on the pipes to mitigate or eliminate ovality of the pipes at the pipe joint.

Figure 3:
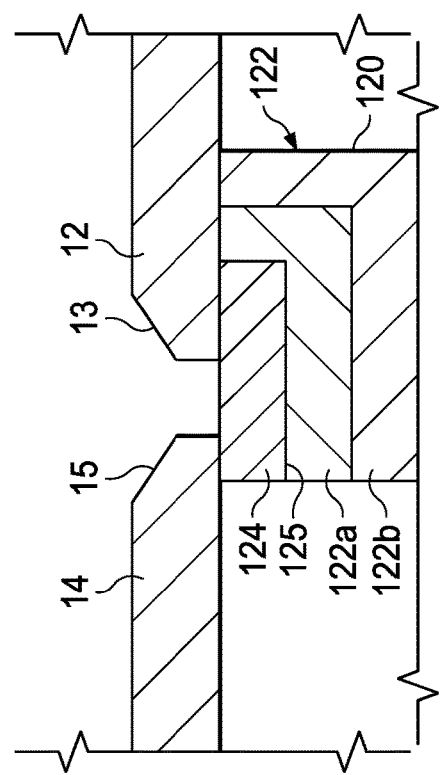
FIG. 3 is a partial cross-sectional view of a pipe joint with a clamping block of the welding clamp of FIG. 1 abutting the pipe joint.

FIG. 3 is a partial cross-sectional view of a pipe joint 16 with a clamping block 120 of the welding clamp 100 of FIG. 1 abutting the pipe joint 16. With reference to FIGS. 2 and 3, the clamping blocks 120 of the welding clamp 100 can facilitate improved welding of the pipe joint 16.

In the depicted example, the pipe joint 16 is formed between pipes 12 and 14. Optionally, the pipes 12 and 14 can be carbon steel pipes. In some embodiments, the respective ends 13 and 15 of the pipes 12 and 14 can be beveled to facilitate fusion across the pipe joint 16.

As illustrated, the clamping block 120, also referred to as backing plate, is disposed under the landing or otherwise abutted against the pipe joint 16 defined by the pipes 12 and 14. During welding operations, the clamping block 120 and the welding clamp 100 generally can stop liquefied material or weld pool material from migrating or dripping past the pipe joint 16 during a root pass or initial pass. The clamping block 120 can further prevent material from "blowing through" the pipe joint during initial passes or subsequent closed passes. As can be appreciated, the welding clamp 100 can be used with any suitable welding process, including but not limited to, solid wire welding, flux core welding, metal core welding, shielded metal arc welding (SMAW), gas metal arc welding (GMAW), gas tungsten arc welding (GTAW), fluxed-core arc welding (FCAW), plasma welding, and/or laser fusion welding.

In the depicted example, a synthetic diamond portion 124 of the clamping block 120 can be disposed under the landing or otherwise abutted against the pipe joint 16. In some embodiments, the synthetic diamond portion 124 can be formed from chemical vapor deposition. In some embodiments, the synthetic diamond portion 124 can be formed from polycrystalline diamond (PCD). Optionally, the synthetic diamond portion 124 can include a synthetic diamond grit, formed from chemical vapor deposition, synthetic diamonds and/or polycrystalline diamonds. PCD can be formed from diamond grit that is fused together in high-pressure, high-temperature conditions in the presence of a catalytic metal. Advantageously, the extreme hardness, wear resistance, and thermal conductivity of polycrystalline diamond provide excellent performance characteristics compared to conventional backing materials used during welding operations.

In some applications, the synthetic diamond portion 124 can be a thin layer of synthetic diamond. In some applications, the synthetic diamond portion 124 can be 6-7 mm thick. Advantageously, the thickness of the synthetic diamond portion 124 can be selected to facilitate heat transfer, minimize cracking and/or wear, and allow for ease of manufacturing and/or assembly. Optionally, the clamping block 120 can include multiple synthetic diamond portions 124. In some embodiments, the synthetic diamond portions 124 can have an exposed surface area of about 0.25 square inches, 0.5 square inches, 1 square inch, 2 square inches, 3 square inches, or 4 square inches. In some applications, the synthetic diamond portion 124 can have a circular cross-section. Advantageously, by utilizing a synthetic diamond portion 124, the clamping block 120 and the welding clamp 100 can withstand higher temperatures compared to certain conventional weld clamps and avoid leaching materials into the weld joint. Further, in some applications, such as in high temperature operations (e.g., in excess of 1400 degrees Celsius), the synthetic diamond portion 124 can sublime from a solid to an inert vapor, preventing contamination of the weld joint. The use of the synthetic diamond portion 124 can allow the clamping blocks 120 to withstand repeated use (e.g., 5000 to 6000 welding operations or one year of welding operations) without replacement.

In some embodiments, the synthetic diamond portion 124 can be disposed on a metallic substrate or metallic portion 122 of the clamping block 120. The metallic portion 122 can be formed from any suitable metallic material. Optionally, the metallic portion 122 can be tungsten carbide. In some applications, the metallic portion 122 can be 8-9 mm thick. Advantageously, the thickness of the metallic portion 122 can be selected to facilitate heat transfer, minimize wear, and allow for ease of manufacturing and/or assembly. As can be appreciated, the synthetic diamond portion 124 can be chemically bonded to the metallic portion 122. In some embodiments, layers of synthetic diamond grit forming the synthetic diamond portion 124 can be disposed on an underlying metallic portion 122. The synthetic diamond portion 124 and the metallic portion 122 can have an overall thickness of about 15-16 mm. Advantageously, the overall thickness of the synthetic diamond portion 124 and the metallic portion 122 can be selected to facilitate operation of the clamping blocks 120 and allow for ease of manufacturing and/or assembly of the clamping blocks 120. Optionally, the metallic portion 122 can be arranged to be spaced apart from the landing or the pipe joint 16 relative to the synthetic diamond portion 124.

In some applications, the metallic portion 122 can function as a heat sink to remove heat from the synthetic diamond portion 124. Optionally, the metallic portion 122 can include a first metallic portion 122a directly coupled to the synthetic diamond portion 124 and a second metallic portion 122b encasing the first metallic portion 122a. The second metallic portion 122b can surround the first metallic portion 122a. The second metallic portion 122b can be formed from aluminum or any other suitable material to remove heat from the synthetic diamond portion 124. In some embodiments, the synthetic diamond portion 124 is not encased by the metallic portion 122. Further, in some embodiments, the synthetic diamond portion 124 is not supported by the metallic portion 122.

Optionally, the synthetic diamond portion 124 and/or the metallic portion 122 can be recessed within the clamping block 120. In some applications, one or more synthetic diamond portions 124 can be disposed within a groove 125. In some embodiments, the clamping block 120 includes a groove 125 to receive the synthetic diamond portion 124 and/or the metallic portion 122. The groove 125 can have a generally rectangular cross-sectional profile configured to receive the synthetic diamond portion 124 and/or the metallic portion 122. The groove 125 can have "square" or approximately 90 degree corners to form a planar groove surface. The groove 125 can be recessed approximately 16-20 mm relative to the face of the clamping block 120.

As can be appreciated, the clamping block 120 can arranged such that the synthetic diamond portion 124 is exposed to the weld material from the pipe joint 16 while preventing the metallic portion 122 from exposure to the weld material. As illustrated, the synthetic diamond portion 124 can have a rectangular cross-sectional profile nested within the metallic portion 122 having an "L" shaped cross-sectional profile. In other words, the metallic portion 122 can extend radially below and circumferentially next to the synthetic diamond portion 124. In some applications, the cross-sectional profile of the synthetic diamond portion 124 can be reduced compared to conventional welding clamps.

With reference to FIGS. 1-3, optionally, during the expansion and/or translation of the clamping blocks 120, the clamping mechanism 110 and/or the actuation mechanism 130 can be configured to align the synthetic diamond portion 124 with the pipe joint 16. Further, in some embodiments, the clamping mechanism 110 and/or the actuation mechanism 130 can be configured to circumferentially align the synthetic diamond portion 124 of each clamping block 120 with the respective synthetic diamond portion 124 of each neighboring clamping blocks 120.

FIG. 4 is an elevation view of a welding clamp 200. With reference to FIG. 4, the welding clamp 200 includes features that are similar to the welding clamp 100. Therefore, unless noted, similar features may be referred to with similar reference numerals. In the depicted example, the welding clamp 200 can include clamping blocks 220 that expand radially outward.

In some embodiments, the clamping mechanism 210 can retract or extend the clamping blocks 220 toward or away from the clamp body 202. Optionally, the clamping mechanism 210 can retract the clamping blocks 220 to prevent the clamping blocks 220 from engaging with an inner diameter of the pipes as the welding clamp 200 is moved to a desired location within the pipeline. As illustrated, the clamping blocks 220 can have a rectangular shape. In some applications, as the clamping blocks 220 radially retract, the clamping blocks 220 can move circumferentially relative to each other to reduce the gap 213 between the clamping blocks 220.

In some applications, an actuator mechanism 230 can move each of the clamping blocks 220 radially outwardly from the clamp body 202 to engage against an inner diameter of the pipe or radially inward toward the clamp body 202 to disengage from the inner diameter of the pipe. The actuator mechanism 230 can include one or more motors, linear actuators, pneumatic actuators, hydraulic circuits, etc.

FIG. 5 is an elevation view of a clamping block 220 of the welding clamp 200 of FIG. 4. Similar to clamping block 120, in some embodiments, the synthetic diamond portion 224 of the clamping block 220 can be disposed under the landing or otherwise abutted against the pipe joint. Further, the synthetic diamond portion 224 can be disposed on a metallic substrate or metallic portion 222 of the clamping block 220. As illustrated, the synthetic diamond portion 224 can be disposed on top of the metallic portion 222 as the outer radial surface of the clamping block 220.

In some embodiments, the synthetic diamond portion 224 can be chemically bonded or fused to the metallic portion 222 at a bond interface 226. In some embodiments, layers of synthetic diamond grit forming the synthetic diamond portion 224 can be disposed on an underlying metallic portion 222.

As illustrated, the synthetic diamond portion 224 can be formed as a thin sheet disposed on top of the metallic portion 222 having a generally rectangular shaped cross-sectional profile. Optionally, the metallic portion 222 can include grooves, indentations or a retention feature 221 to allow the clamping mechanism 210 to engage with and move the clamping blocks 220.

FIG. 6 is an elevation view of the welding clamp 200 of FIG. 5 with the clamping blocks 220 in an expanded position. During operation, the clamping mechanism 210 can expand the clamping blocks 220 toward the inner diameter of the abutting pipes by moving the clamping blocks 220 radially away from the clamp body 202. In some embodiments, the clamping blocks 220 can move circumferentially relative to each other to increase the gap 213 therebetween. During operation, the actuated clamping blocks 220 can align the pipe joint between the pipes in preparation for welding. In some applications, the actuated clamping blocks 220 can exert force on the pipes to mitigate or eliminate ovality of the pipes at the pipe joint.

FIG. 7 is a partial cross-sectional view of a weld joint 300 with a backing plate 320 abutting the weld joint 300. In the depicted example, a weld joint 300 is formed between a material 312 and a material 314. In some embodiments, the respective ends 313 and 315 of the materials 312 and 314 can be beveled to facilitate fusion across the weld joint 300.

As can be appreciated, a backing plate 320 with a synthetic diamond portion 324 as described herein can abut or otherwise be disposed adjacent to any suitable weld joint to provide temporary backup, reinforcement, and/or support to the weldment to prevent environmental contamination and/or to prevent material from "blowing through" the weld joint due to gravity. In some embodiments, the backing plate 320 can abut or otherwise be disposed adjacent to any suitable weld joint 300 without a welding clamp 100, 200. Other suitable mechanisms can be utilized to locate or position the backing plate 320 relative to the weld joint 300. The backing plate 320 with a synthetic diamond portion 324 as described herein can be used with any suitable welding process, including but not limited to, solid wire welding, flux core welding, metal core welding, shielded metal arc welding (SMAW), gas metal arc welding (GMAW), gas tungsten arc welding (GTAW), fluxed-core arc welding (FCAW), plasma welding, and/or laser fusion welding. The backing plate 320 with a synthetic diamond portion 324 as described herein can be used for pipe welding, flat plate welding, ship building, submarine building, and/or rig construction.

As illustrated, the backing plate 320 is disposed under the landing or otherwise abutted against the weld joint 300 defined by the materials 312 and 314. During welding operations, the backing plate 320 generally can stop liquefied material or weld pool material from migrating or dripping past the weld joint 300 during a root pass or initial pass. The backing plate 320 can further prevent material from "blowing through" the weld joint during initial passes or subsequent closed passes.

In the depicted example, a synthetic diamond portion 324 of the backing plate 320 can be disposed under the landing or otherwise abutted against the weld joint 300. As described herein, the synthetic diamond portion 324 can be formed as a similar manner and provide similar advantages as described with respect to the synthetic diamond portion 124 and 224.

In some embodiments, the synthetic diamond portion 324 can be disposed on a metallic substrate or metallic portion 322 of the backing plate 320. As can be appreciated, the metallic portion 322 can include the same or similar characteristics of the metallic portion 122 and 224. In some applications, the metallic portion 322 can function as a heat sink to remove heat from the synthetic diamond portion 324 as described herein.

Figure 8:
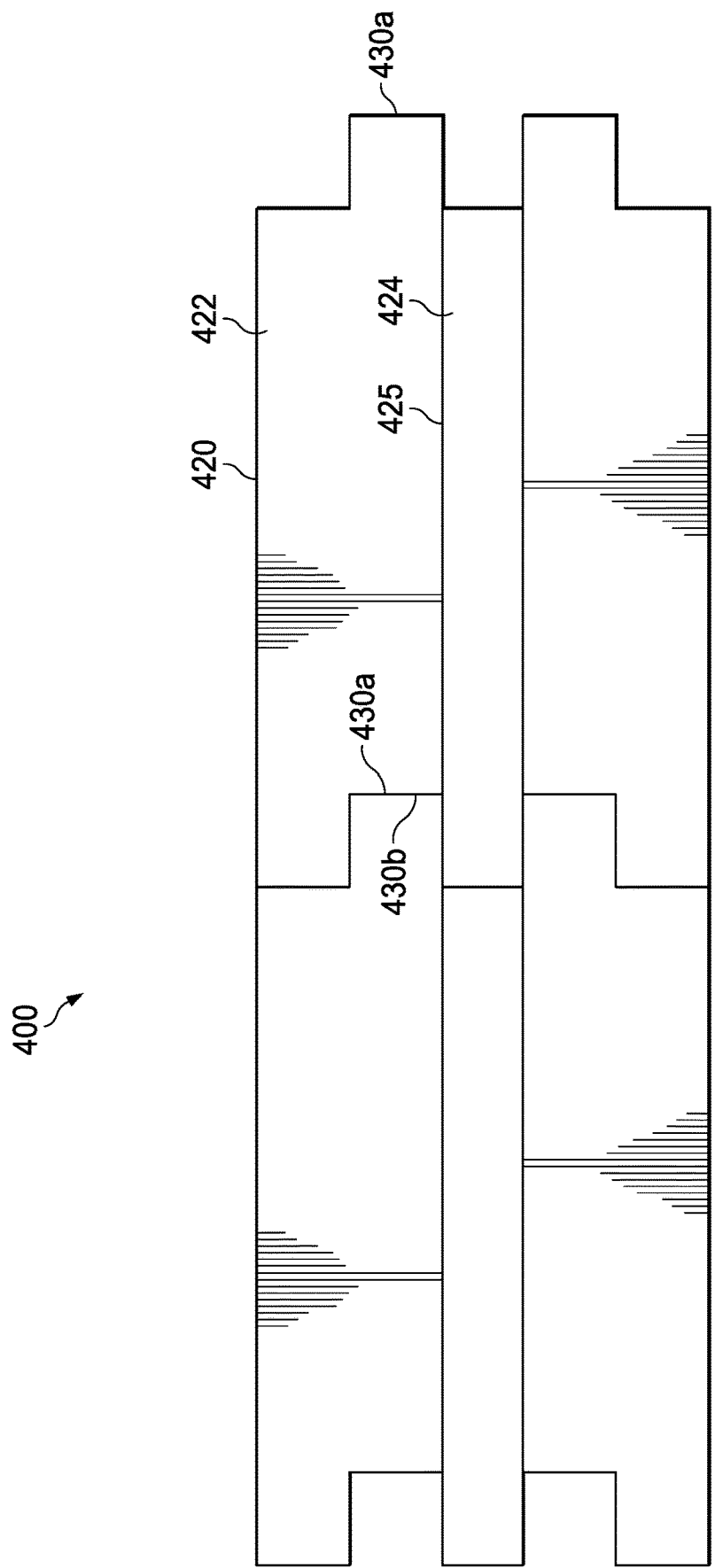
FIG. 8 is a front elevation view of a backing plate assembly.
Figure 9:
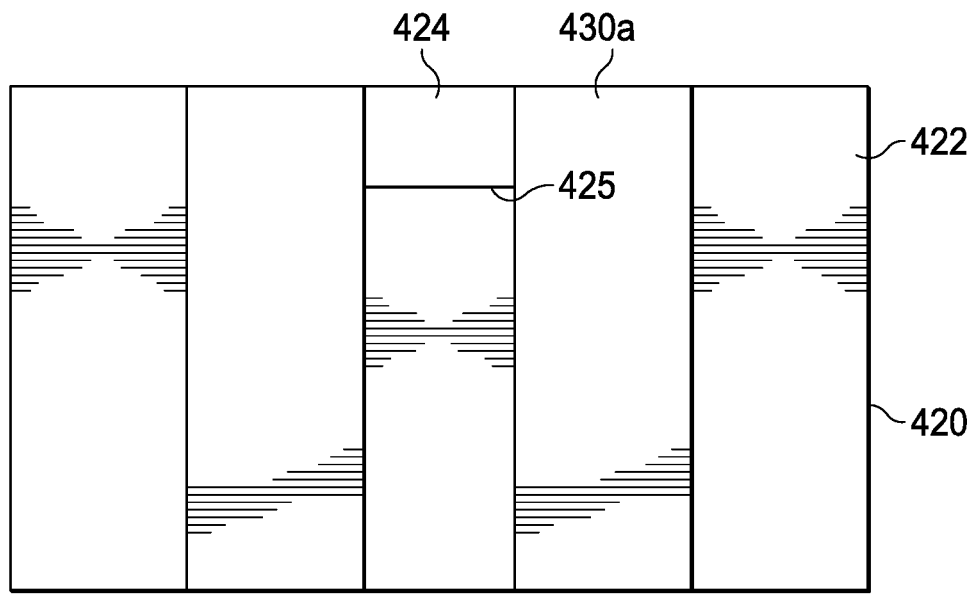
FIG. 9 is a side elevation view of the backing plate of FIG. 8.
Figure 10:
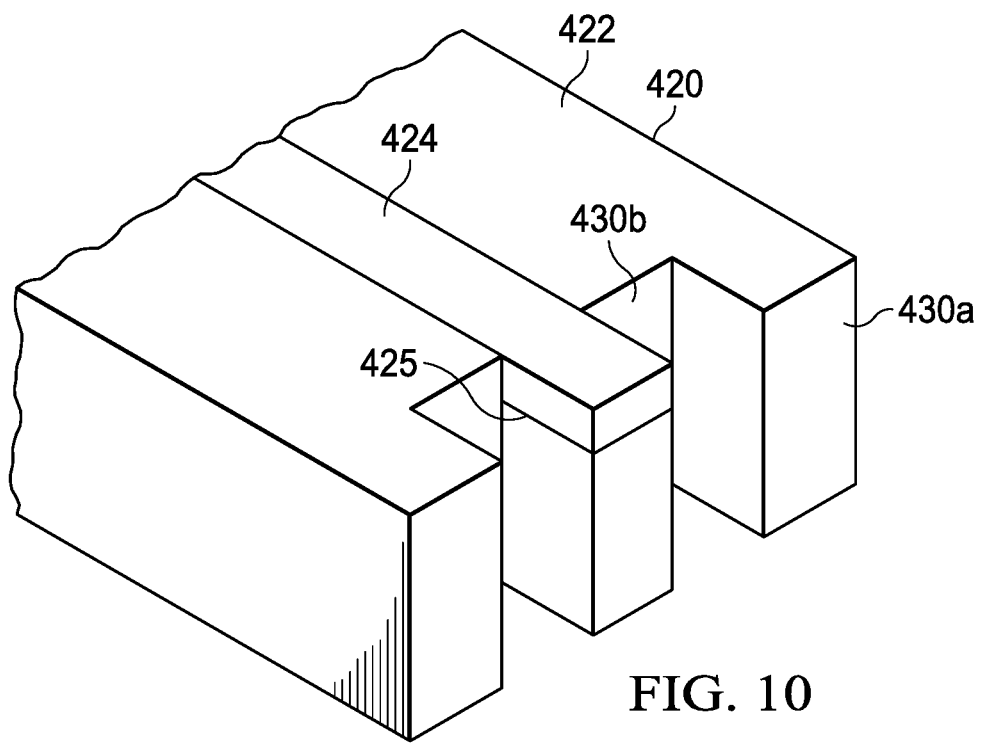
FIG. 10 is a partial perspective view of the backing plate of FIG. 8.

FIG. 8 is a front elevation view of a backing plate assembly 400. FIG. 9 is a side elevation view of the backing plate 420 for use with the backing plate assembly 400 of FIG. 8. FIG. 10 is a partial perspective view of the backing plate 420 for use with the backing plate assembly 400 of FIG. 8. With reference to FIGS. 8-10, in the depicted example, the backing plate assembly 400 can abut or otherwise be disposed adjacent to any suitable weld joint to provide temporary backup, reinforcement, and/or support to the weldment to prevent environmental contamination and/or to prevent material from "blowing through" the weld joint due to gravity. In some embodiments, the backing plate assembly 400 can abut or otherwise be disposed adjacent to any suitable weld joint. Optionally, the backing plate assembly 400 is configurable to allow the backing plate assembly 400 to be used with weld joints of various lengths or sizes.

As illustrated, the backing plate assembly 400 can include one or more backing plates 420 that are assembled, connected, or otherwise grouped to form the backing plate assembly 400. Similar to backing plate 320, each backing plate 420 includes a synthetic diamond portion 424 as described herein.

During operation, each backing plate 420 of the backing plate assembly 400 can be disposed under the landing or otherwise abutted against a weld joint. In the depicted example, a synthetic diamond portion 424 of the backing plate 420 can be disposed under the landing or otherwise abutted against the weld joint. Optionally, the synthetic diamond portion 424 can be approximately 1 inch to 0.25 inches wide. As described herein, the synthetic diamond portion 424 can be formed as a similar manner and provide similar advantages as described with respect to the synthetic diamond portion 324.

In some embodiments, the synthetic diamond portion 424 can be disposed on a metallic substrate or metallic portion 422 of the backing plate 420. As illustrated, the synthetic diamond portion 424 can be embedded within the metallic portion 422. Optionally, the synthetic diamond portion 424 can be embedded within a groove 425 defined within the metallic portion 422 of the backing plate 420. Optionally, the synthetic diamond portion 424 can extend a depth of 1 inch to 0.1 inches, into the metallic portion 422. As can be appreciated, the metallic portion 422 can include the same or similar characteristics of the metallic portion 322. In some applications, the metallic portion 422 can function as a heat sink to remove heat from the synthetic diamond portion 424 as described herein.

In some embodiments, the backing plate 420 can extend any suitable length to span a weld joint. The backing plate 420 can have a length of 6 inches, 1 foot, 2 feet, 3 feet, 4 feet, etc. Optionally, the backing plate assembly 400 can include multiple backing plates 420 that are assembled together to span weld joints that are longer than a single backing plate 420. In some applications, backing plates 420 of various lengths can be assembled together to span a weld joint.

The backing plates 420 can include features that allow the backing plates 420 to be engaged or retained together. As illustrated, the backing plates 420 can include interlocking features such as extensions 430*a* and recesses 430*b* that allow the backing plates 420 to engage together. In the depicted example, the backing plate 420 can include extensions 430*a* that extend from the ends of the backing plate 420. In some embodiments, the extensions 430*a* can have a generally rectangular cross-sectional profile. Optionally, the synthetic diamond portion 424 can extend along the length of a central extension 430a.

In the depicted example, the extensions 430a are spaced apart to define recesses 430b therebetween. In certain applications, the recesses 430b of a backing plate 420 can be configured to receive the extensions 430a of another backing plate 420. In some embodiments, the arrangement of the extensions 430a and the recesses 430b on a first end of the backing plate 420 can be configured to engage with an arrangement of extensions 430a and recesses 430b of a second end of another backing plate 420, allowing the backing plates 420 to be properly assembled. In some embodiments, the spacing of the extensions 430a and the recesses 430b can permit the backing plates 420 to frictionally engage or "snap" together. Optionally, the extensions 430a and the recesses 430b can be configured to facilitate alignment of the synthetic diamond portions 424 of each respective backing plate 420 of the backing plate assembly 400.

Figure 11:
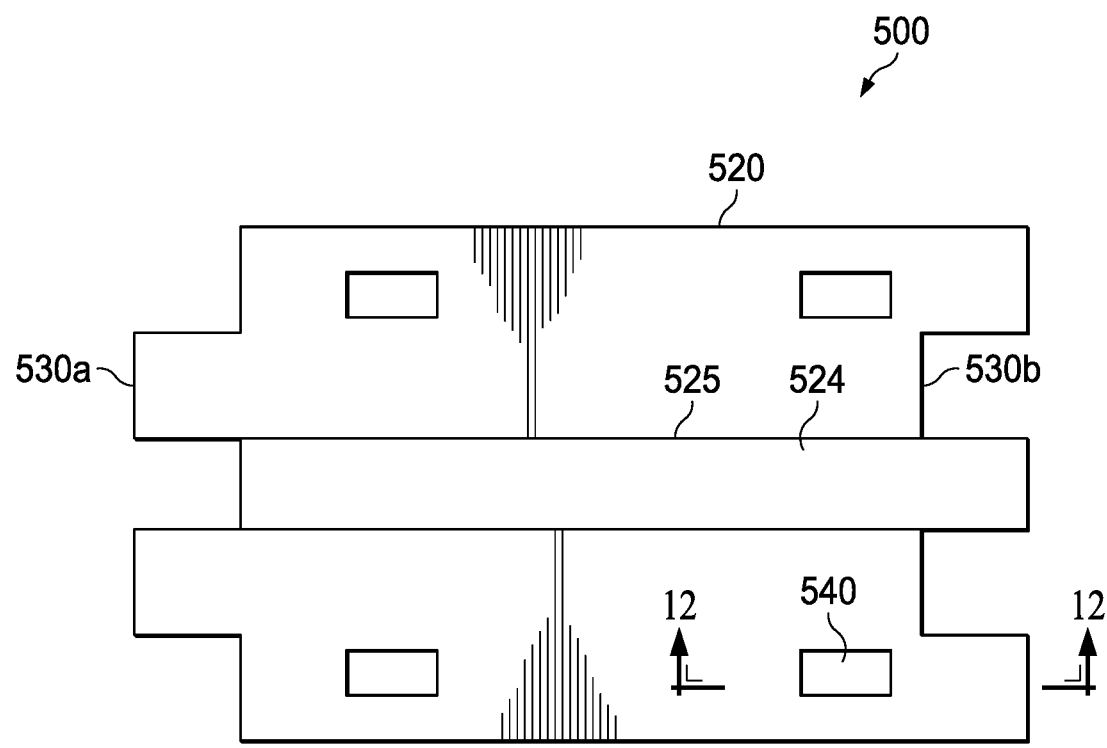
FIG. 11 is a front elevation view of a backing plate assembly.
Figure 12:
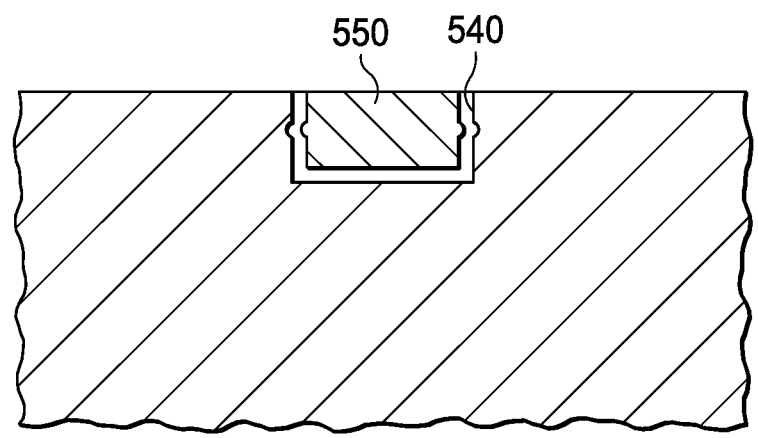
FIG. 12 is a partial cross-sectional view of the backing plate of FIG. 11.

FIG. 11 is a front elevation view of a backing plate assembly 500. FIG. 12 is a partial cross-sectional view of the backing plate 500 of FIG. 11. The backing plate assembly 500 includes features that are similar to the backing plate assembly 400. Therefore, unless indicated, similar features will be referred to with similar reference numerals. With reference to FIGS. 11 and 12, the backing plate assembly 500 allows the backing plate 520 to be located or positioned relative to the weld joint.

In some embodiments, the backing plate 520 includes a magnetic portion 550 to allow the backing plate 520 to be magnetically coupled or otherwise affixed to ferrous materials forming a weld joint. As illustrated, the magnetic portion 550 can be attached to the backing plate 520 within a groove or pocket 540 defined in the backing plate 520. In some embodiments, the backing plate 520 can include multiple magnetic portions 550 to allow the backing plate 520 to be secured to the materials forming the weld joint.

Advantageously, by utilizing the magnetic portions 550, the backing plate 520 can be positioned to align the synthetic diamond portion 524 under the landing or otherwise abutted against the weld joint. Further, the magnetic portions 550 can allow the backing plate 520 and the synthetic diamond portions 524 to be aligned with the weld joint without the use of any additional hardware, minimizing cost and labor.

Figure 13:
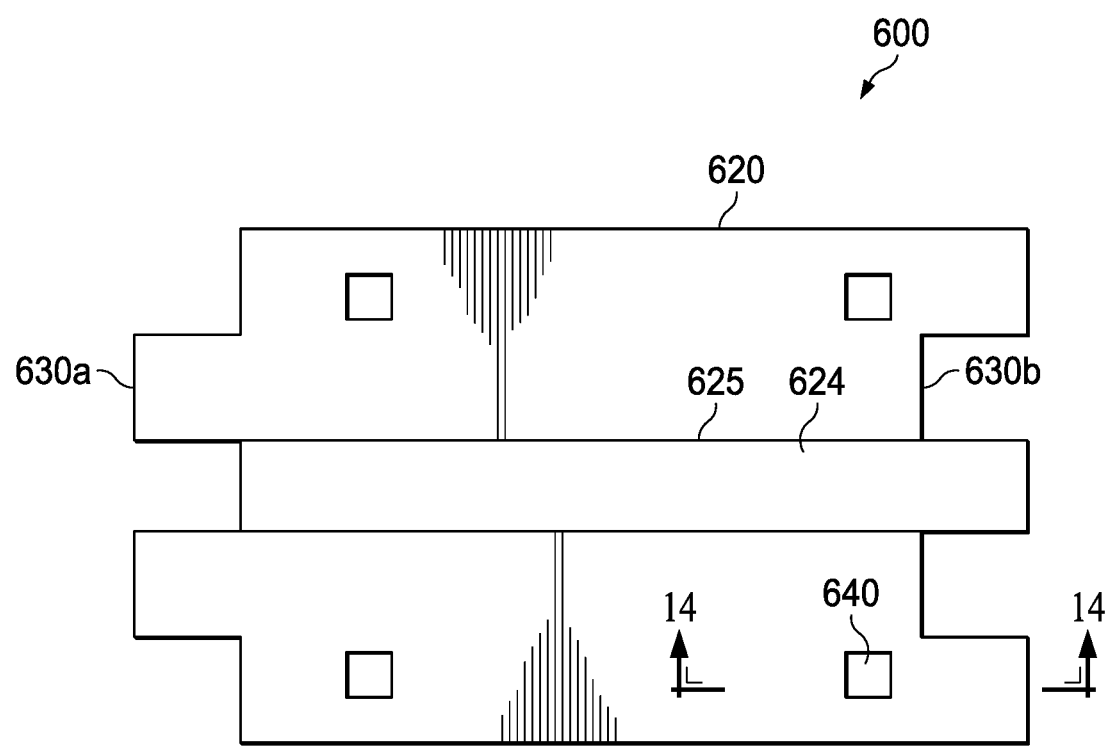
FIG. 13 is a front elevation view of a backing plate assembly.
Figure 14:
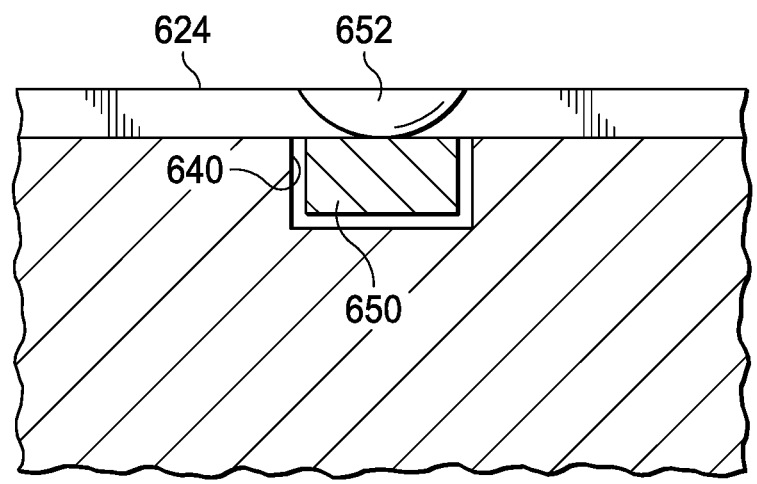
FIG. 14 is a partial cross-sectional view of the backing plate of FIG. 13.

FIG. 13 is a front elevation view of a backing plate assembly 600. FIG. 14 is a partial cross-sectional view of the backing plate 620 of FIG. 13. The backing plate assembly 600 includes features that are similar to the backing plate assembly 500. Therefore, unless indicated, similar features will be referred to with similar reference numerals. With reference to FIGS. 13 and 14, the backing plate assembly 600 allows the backing plate 620 to be located or positioned relative to the weld joint.

In some embodiments, the backing plate 620 includes a suction device 650 to allow the backing plate 620 to be coupled or otherwise affixed to materials forming a weld joint. As illustrated, the suction device 650 can be attached to the backing plate 620 within a groove or pocket 640 defined in the backing plate 620. In some embodiments, the backing plate 620 can include multiple suction devices 650 to allow the backing plate 650 to be secured to the materials forming the weld joint.

As illustrated, the suction device 650 includes a suction cup 652 extending from the base portion of the suction device 650. The suction cup 652 can utilize a suction force against a smooth surface to retain the backing plate 620 against the materials forming the weld joint.

Advantageously, by utilizing the suction device 650, the backing plate 620 can be positioned to align the synthetic diamond portion 624 under the landing or otherwise abutted against the weld joint. Further, the suction device 650 can allow the backing plate 620 and the synthetic diamond portions 624 to be aligned with the weld joint without the use of any additional hardware, minimizing cost and labor.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:
1. A welding clamp, comprising:
 a clamp body; and
 a plurality of clamping blocks configured to radially expand from the clamp body, wherein each clamping block comprises a synthetic diamond portion configured to abut an internal pipe joint region during a welding operation.

2. The welding clamp of claim 1, wherein the synthetic diamond portion comprises polycrystalline diamond.

3. The welding clamp of claim 1, wherein each clamping block comprises a metallic portion configured to be spaced apart from the pipe joint region during the welding operation.

4. The welding clamp of claim 3, wherein the synthetic diamond portion is chemically bonded to the metallic portion.

5. The welding clamp of claim 1, further comprising a clamping mechanism configured to radially expand the plurality of clamping blocks.

6. The welding clamp of claim 5, wherein the clamping mechanism is further configured to translate the plurality of clamping blocks during radial expansion.

7. The welding clamp of claim 6, wherein the clamping mechanism is configured to align the synthetic diamond portion of each of the plurality of clamping blocks during translation.

8. The welding clamp of claim 5, further comprising an actuator to actuate the clamping mechanism.

9. The welding clamp of claim 5, wherein the clamping mechanism engages with each clamping block at a groove defined in each clamping block.

10. A method, comprising:
forming a pipe joint between a plurality of pipes;
disposing a welding clamp having a clamp body within an inner diameter of at least one pipe of the plurality of pipes;
radially expanding a plurality of clamping blocks from the clamp body of the welding clamp; and
abutting a synthetic diamond portion of each clamping block with the pipe joint during a welding operation.

11. The method of claim 10, wherein the synthetic diamond portion comprises polycrystalline diamond.

12. The method of claim 10, wherein each clamping block comprises a metallic portion configured to be spaced apart from the pipe joint.

13. The method of claim 12, wherein the synthetic diamond portion is chemically bonded to the metallic portion.

14. The method of claim 10, further comprising radially expanding the plurality of clamping blocks via a clamping mechanism.

15. The method of claim 14, further comprising translating the plurality of clamping blocks during radial expansion.

16. The method of claim 15, further comprising aligning the synthetic diamond portion of each of the plurality of clamping blocks during translation.

17. The method of claim 14, further comprising actuating the clamping mechanism.

18. The method of claim 14, wherein the clamping mechanism engages with each clamping block at a groove defined in each clamping block.

* * * * *